Patented Apr. 5, 1938

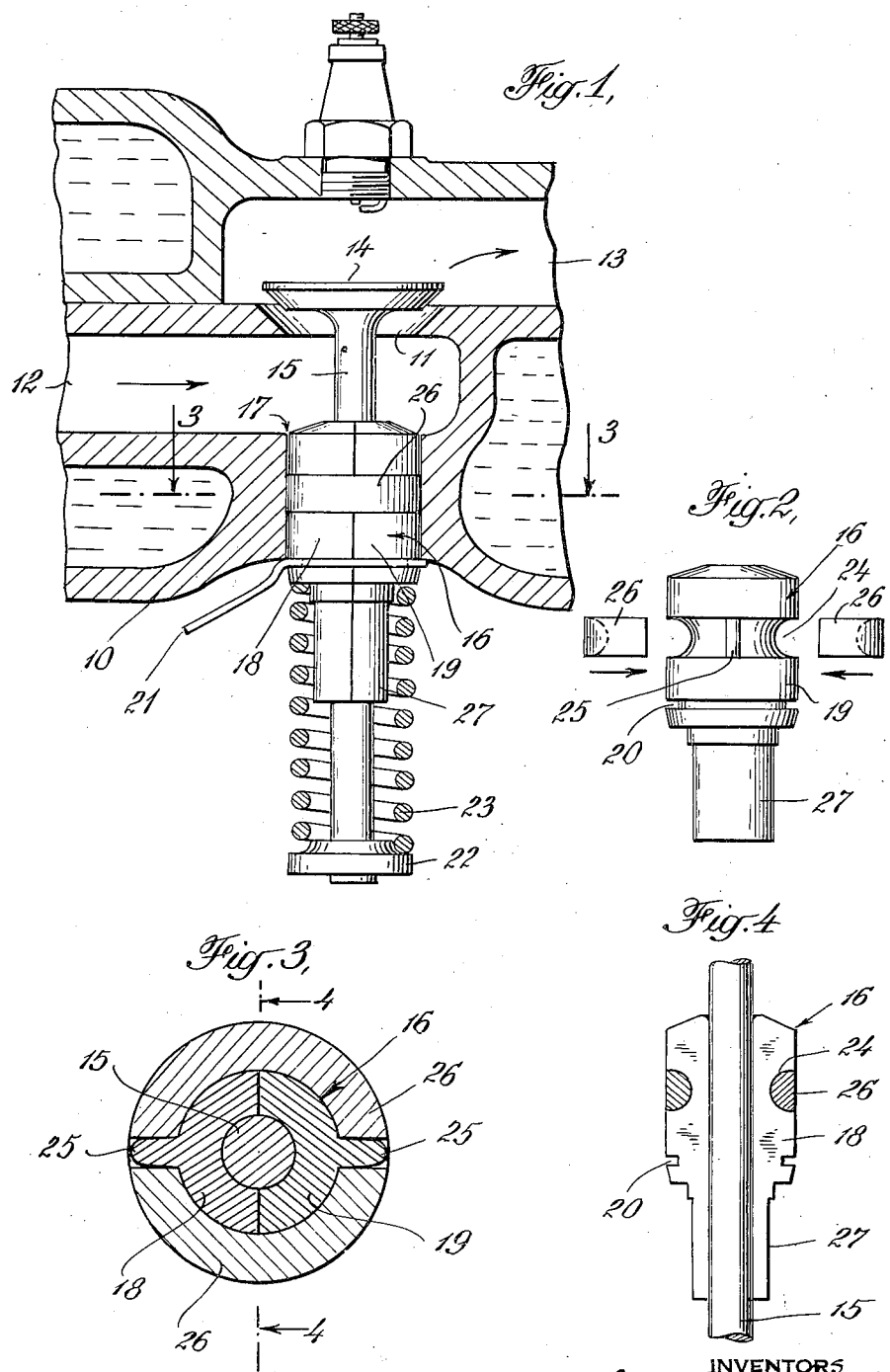

2,112,832

UNITED STATES PATENT OFFICE

2,112,832

SELF-SEALING ENGINE VALVE GUIDE

George Warren Douglas, New York, N. Y., and John Joseph Dewey, Greenwich, Conn.

Application July 10, 1936, Serial No. 90,020

9 Claims. (Cl. 123—188)

This invention relates to a self-sealing guide for the valve stem of an internal combustion engine, and has particular reference to an arrangement whereby a normally open joint caused by the construction of the valve guide is thermostatically closed during the operation of the engine to prevent loss of fuel and leakage of air into the combustion chamber.

It is common practice to provide separate guides for the stems of the valves in internal combustion engines, such as automobile engines and the like, to facilitate insertion and removal of the valves and to avoid machining the engine block to provide a passage for the valve stem. Where such valve stem guides are employed and particularly in the Ford and Lincoln Zephyr automobiles, the guide must be made relatively loose to permit its ready insertion and removal from the corresponding hole in the engine block. This leaves a narrow annular space between the outer surface of the valve guide and the wall of the corresponding hole in the engine block which, as the engine becomes hot increases in size, due to the unequal thermal expansions of the guide and the block. Consequently, the combustible mixture is changed, air leaking in through this space during the suction stroke and at other times. Furthermore, at the intake valve, raw gas frequently trickles through this space, thus not only wasting gasoline and further reducing the richness of the mixture, but also diluting the oil within the crank case. The net result is inefficiency in operation and loss of power. Also, in some engines, particularly the Ford and Lincoln Zephyr engines, the valve stem guides are formed in two complementary halves provided with registering complementary grooves into which a locking key is inserted in order to align and hold the two halves together, and unless these grooves are actually in registry it is possible in assembling to insert the key in the groove of one of them and not in the other, so that the guide halves are not aligned axially as they should be. This key is also subject to loosening and frequently falls out due to vibration.

In accordance with the present invention, thermostatic means are provided for a valve stem guide of the type described, whereby when the engine becomes hot, the guide is automatically sealed pressure-tightly within the hole in the engine block within which it is located, and the guide is also locked in position by this thermostatic means so that it cannot become loosened and is otherwise so arranged that the two halves of the split type of guide must be in axial registry at all times.

More particularly, the invention comprehends an insert of material having a relatively high coefficient of thermal expansion between the valve stem guide and the wall of the hole in the engine block in which it is located, so that as the engine becomes hot this material expands thermostatically and seals the joint between the valve stem guide and the engine block and also locks the guide in position at the same time. The insert of high expanding material is preferably in the form of a ring and for the Ford and Lincoln Zephyr engines, it is provided in the form of two substantially semi-circular sections, which cooperate to form the ring and which fit in registering annular grooves in the complementary valve guide halves, so as to span both halves, whereby they must be aligned axially before they can be inserted jointly into the corresponding hole in the engine block and remain locked together.

It will be seen that with this simple arrangement the intake chamber is made tight against air leakage into and gasoline leakage out of the chamber around the valve stem guide and that the valve stem guide cannot be mis-aligned axially because the ring serves as a keeper for maintaining the two halves of the guide in proper axial registry. Consequently, the engine operates more efficiently, carburation is constant for all temperatures of operation, and dilution of the lubricating oil in the crank case, due to raw gas leakage, is reduced.

For a more complete understanding of the invention, reference may be had to the accompanying drawing, in which:

Figure 1 illustrates an internal combustion engine provided with the self-sealing valve guide of this invention;

Fig. 2 illustrates the manner of assembling of the valve stem guide and the sealing half-ring;

Fig. 3 is a transverse section through the sealing device as seen along the line 3—3 of Fig. 1; and, Fig. 4 is an axial section therethrough as seen along the line 4—4 of Fig. 3.

Referring to the drawing, numeral 10 designates a portion of the head of an internal combustion engine having an intake port 11 supplied with combustible mixture from the carburetor or the like through intake chamber 12 and leading to the combustion chamber 13. This port 11 is adapted to be closed by the valve 14 which is provided with a stem 15 passing through a guide 16 inserted in a hole in the engine block 10. The extremity of the stem 15 is adapted to be engaged by the usual tappet, not shown.

The valve stem guide 16 fits relatively loosely in the engine block hole to facilitate assembly and disassembly, and as the engine becomes hot the unequal thermal expansion between the guide 16 and the engine block results in the formation of an appreciable annular space between them, as is indicated in exaggerated form at 17 in Fig. 1. Inasmuch as the fit between the valve stem 15 and the guide 16 is close and the diameter of the stem is small, there is little or no tendency to leakage of air or gasoline at that point. Also the heat of the valve vaporizes any raw gasoline that might collect on the stem 15 and the domed head of the guide 16 deflects all gasoline away from the stem 15.

The particular guide 16 illustrated in the drawing is of the type employed in the Ford and Lincoln Zephyr automobile engines, but it is to be understood that the invention is not limited to an adaptation to such engines, the illustration being merely by way of example. This guide 16 is divided axially, forming the two halves 18 and 19, each of which is provided with a groove 20 adapted to receive a key 21 for holding them in axial alignment after they have been inserted in the hole in the engine block 10, as illustrated in Fig. 1. Interposed between the lower end of the valve stem guide 16 and a collar 22 on the extremity of the valve stem 15 is the valve closing spring 23, which not only urges the valve 14 to closed position but holds the valve stem guide 16 in proper position within the engine block 10.

As shown particularly in Fig. 2, the valve stem guide 16 is provided with an annular groove 24 of substantially semi-circular cross-section. This groove is not circumferential but is interrupted by the two opposite ribs 25, as shown in Figs. 2 and 3. Located within these two registering, substantially semi-circular halves of the groove 24 are the two halves of a split ring 26. This ring 26 is substantially semi-circular in cross-section to conform to the groove 24, as shown in Fig. 3, and substantially fills the groove 24, being assembled on the guide as illustrated in Fig. 2. Inasmuch as the two halves of this ring 26 span the line of cleavage of the two halves 18 and 19 of the valve stem guide 16, they serve to maintain the two halves of the valve stem guide 16 in exact axial alignment, so that the key 21 must be inserted in both halves of the groove 20 and cannot be inserted in one half of the groove 20 and around the reduced extension 27 of the guide 17, as is possible when the two halves 18 and 19 of the guide 17 are not in exact axial registry.

The ring 26 is formed of material having a relatively high coefficient of thermal expansion such as copper, brass, bronze, or the like, so as to expand when heated relatively to guide 16 to produce a thermostatic action.

In operation, the ring 26 in the valve stem guide 16 expands as the engine becomes hot so as to tightly seal the annular space 17 between the hole in the engine block 10 and the valve stem guide 16, as is illustrated in exaggerated form in Fig. 1, whereby there can be no leakage therethrough under normal operation of the engine. Consequently, air is not drawn through space 17 during the suction stroke to dilute the mixture nor can raw gas trickle through this space into the crank case to dilute the oil.

The ring 26 is easily inserted without change in the existing structure of the valve guide 16 of the Ford and Lincoln Zephyr engines, and may be adapted to valve guides of other engines simply by providing a groove in the exterior surface of the valve stem guide where such guides are not provided with grooves in the first instance.

Inasmuch as the guide 16 does not move within the engine block during operation of the engine, there is no wear on the ring 26, so that it lasts indefinitely. Obviously, the ring 26 may be made completely circular and of one piece, instead of being interrupted by the ribs 25, may have any desirable cross-sectional shape, and may be cast or pressed in the groove 24.

Inasmuch as the expansion of the ring 26 keeps the valve stem guide 16 tightly in position in the engine block, it does not vibrate during the operation of the engine, so that the key 21 is not shaken out of it, as not infrequently happens at present. Furthermore, since the ring 26 acts as a keeper there can be no mis-alignment of the two halves 18 and 19 of the valve stem guide 16, even though force is applied to only one of them during insertion or removal of the valve in the engine block 10.

While the thermostatic action is not desired, the ring 26 need not be of high-expanding material and thus acts only as a keeper for axially aligning the two halves of the guide 16, although the ring may also be of non-metallic packing material, such as asbestos cording in which case it will act as sealing packing, as well as a keeper.

Although a preferred embodiment of the invention has been illustrated and described herein, it is to be understood that the invention is not limited thereby but is susceptible of changes in form and detail within the scope of the appended claims.

We claim:

1. In combination with an internal combustion engine having a valve and a relatively stationary guide therefor inserted in a hole in the engine block, a substantially annular element having a relatively high coefficient of thermal expansion encircling the guide in close contact therewith and engaging the wall of the corresponding hole in the engine block upon expansion in response to the heat of the engine to seal the joint between the guide and the engine block during operation of the engine.

2. In combination with an internal combustion engine having a valve and a relatively stationary guide therefor inserted in a hole in the engine block and having a substantially annular recess, a ring of material having a relatively high coefficient of thermal expansion encircling the guide in the recess and in close contact with the inner wall thereof, said ring engaging the wall of the corresponding hole in the engine block upon expansion in response to the heat of the engine to seal the joint between the guide and the engine block during operation of the engine.

3. In combination with an internal combustion engine having a valve and a guide therefor inserted in a hole in the engine block, said guide having an exterior annular groove, a plurality of complementary segments of a ring having a relatively high coefficient of thermal expansion within the groove for expanding in response to the heat of the engine to seal the joint between the guide and the engine block during operation of the engine.

4. In combination with an internal combustion engine having a valve and a relatively stationary guide therefor inserted in a hole in the engine block, said guide being split axially into complementary sections encircling the valve stem, a ring of material having a relatively high coefficient of thermal expansion encircling said guide to expand thermostatically to seal the joint between the guide and the wall of the corresponding hole in the engine block during operation of the engine.

5. In combination with an internal combustion engine having a valve and a relatively stationary guide therefor inserted in a hole in the engine block, said guide being split axially into complementary sections encircling the valve stem and having an annular exterior groove, a ring of material having a relatively high coefficient of thermal expansion in the groove to expand thermostatically to seal the joint between the guide and the wall of the corresponding hole in the engine block during operation of the engine.

6. In combination with an internal combustion engine having a valve and a guide therefor inserted in a hole in the engine block, said guide being split axially into two complementary sections enclosing the valve stem and having an annular exterior groove, a two segment ring held in the groove by the wall of the hole in the engine block, each segment spanning the corresponding joint between the two sections of the guide, said ring being formed of material having a relatively high coefficient of thermal expansion for sealing the joint between the guide and the engine block in response to the heat of the latter during operation of the engine.

7. In combination with an internal combustion engine having a valve and a guide therefor inserted in a hole in the engine block, said guide being split axially into complementary sections encircling the valve stem and having an exterior groove spanning the joint between said guide sections, means in said groove and spanning the said joint between said guide sections for locking them together in axial alignment.

8. In combination with an internal combustion engine having a valve and a guide therefor inserted in a hole in the engine block, said guide being split axially into complementary sections encircling the valve stem and having an exterior substantially annular groove, and packing means in the groove for sealing the joint between the guide and the wall of the hole in the engine block.

9. In combination with an internal combustion engine having a valve and a relatively stationary guide therefor inserted in a hole in the engine block, a substantially annular element having a relatively high coefficient of thermal expansion interposed between a portion of the guide and the wall of the hole in the engine block and expansible in response to the heat of the engine into tight and fixed engagement with the guide and the wall to seal the joint between the guide and the engine block during operation of the engine.

GEORGE WARREN DOUGLAS.
JOHN JOSEPH DEWEY.